US011773913B2

(12) United States Patent
Kronberger (10) Patent No.: US 11,773,913 B2
(45) Date of Patent: Oct. 3, 2023

(54) CLUTCH (71) Applicant: Miba Sinter Austria GmbH, Laakirchen (AT)

(72) Inventor: Christian Kronberger, Vorchdorf (AT)

(73) Assignee: MIBA SINTER AUSTRIA GMBH, Laakirchen (AT)

( * ) Notice: Subject to any disclaimer, the term of this patent is extended or adjusted under 35 U.S.C. 154(b) by 0 days.

(21) Appl. No.: 18/076,522

(22) Filed: Dec. 7, 2022

(65) Prior Publication Data
US 2023/0235795 A1 Jul. 27, 2023

(30) Foreign Application Priority Data
Jan. 24, 2022 (AT) .............................. A 50028/2022

(51) Int. Cl.
*F16D 11/14* (2006.01)
*B60K 6/38* (2007.10)
*F16D 11/00* (2006.01)

(52) U.S. Cl.
CPC ................ *F16D 11/14* (2013.01); *B60K 6/38* (2013.01); *F16D 2011/006* (2013.01); *F16D 2300/12* (2013.01)

(58) Field of Classification Search
CPC ........... F16D 2011/002; F16D 2300/12; F16D 11/14
See application file for complete search history.

(56) References Cited

U.S. PATENT DOCUMENTS

| 10,933,731 B2 | 3/2021 | Fliearman et al. |
| 2006/0112779 A1 * | 6/2006 | Pamminger ............. F16H 55/17 74/431 |
| 2013/0112027 A1 * | 5/2013 | Buchleitner ............ F16H 55/18 74/440 |

(Continued)

FOREIGN PATENT DOCUMENTS

| DE | 102011119574 A1 * | 5/2013 | ............... B21K 1/30 |
| DE | 10 2014 221 545 A1 | 5/2015 | |
| DE | 10 2020 203 410 A1 | 10/2020 | |

OTHER PUBLICATIONS

Machine translation of DE 102011119574A1, retrieved from espacenet.com (Year: 2023).*

*Primary Examiner* — Stacey A Fluhart
(74) *Attorney, Agent, or Firm* — Collard & Roe, P.C.

(57) ABSTRACT

A torque-transmitting clutch includes a first clutch element having a first base body and a first end face, a second clutch element, and a third clutch element having a third base body. In a closed position, the first and the second clutch elements are connectable in a positive locking and/or force-fit manner for transmitting torque, and in an open position, this positive locking and/or force-fit connection is released, and wherein the first clutch element is connectable to the third clutch element in a positive locking and/or force-fit manner. The first clutch element is produced according to a powder-metallurgical or an additive method and has at least one centering projection arranged on the first end face and extending towards the third clutch element to cooperate with (Continued)

and/or be accommodated with a centering recess in an end face in the third clutch element in a positive locking and/or force-fit manner.

9 Claims, 7 Drawing Sheets

(56) References Cited

U.S. PATENT DOCUMENTS

| | | | | |
|---|---|---|---|---|
| 2014/0360300 | A1* | 12/2014 | Viechtbauer | F16H 55/18 |
| | | | | 74/445 |
| 2019/0145461 | A1* | 5/2019 | Karlsberger | F16C 33/08 |
| | | | | 384/276 |
| 2019/0203779 | A1* | 7/2019 | Baehr | F16H 63/30 |
| 2020/0318692 | A1* | 10/2020 | Asai | F16D 11/14 |
| 2021/0380078 | A1* | 12/2021 | Plow | B60T 7/085 |

* cited by examiner

CLUTCH

CROSS REFERENCE TO RELATED APPLICATIONS

Applicant claims priority under 35 U.S.C. § 119 of Austrian Application No. A50028/2022 filed Jan. 24, 2022, the disclosure of which is incorporated by reference.

The invention relates to a torque-transmitting clutch comprising a first clutch element having a first base body and a first end face, a second clutch element having a second base body, and a third clutch element having a third base body, wherein, in a closed position, the first and the second clutch element are connectable in a positive locking and/or force-fit manner for transmitting torque, and in an open position, this positive locking and/or force-fit connection is released, and wherein the first clutch element is connectable to the third clutch element in a positive locking and/or force-fit manner.

Furthermore, the invention relates to a drive train of a motor vehicle with two drives, in particular with one combustion engine and with one electric motor or with two electric motors, wherein one of the two drives may be connected to or released from the drive train by means of a clutch.

Hybrid vehicles are characterized in that in the drive train, a combustion engine is combined with an electric motor. From the prior art, a great variety of architectures are known, wherein the electric motor is often designed such that it can be uncoupled from the drive train. For this purpose, a so-called disconnect unit may be in-stalled, for example. The connection and disconnection is carried out, for example, by means of axial displacement of a clutch sleeve on a first clutch element (the carrier body), in order to enable a positive locking connection to the counter body for the purpose of power transmission. In this regard, the first clutch element is centered by means of dowel pins. The production of these clutch bodies is complex due to the necessary mechanical processing.

The present invention is based on the object of simplifying the production of such clutch elements (carrier bodies) in order to thus be able to provide the drive train of a hybrid vehicle more cost-effectively.

The object is achieved by the initially mentioned clutch, in which the first clutch is produced according to a powder-metallurgical method or an additive method, and has at least one centering projection, which is arranged on the first end face and extends in the direction towards the third clutch element in order to cooperate in a positive locking and/or force-fit manner with a recess in an end face in the third clutch element.

Moreover, the object of the invention is achieved in the initially mentioned drive train in that it has the clutch according to the invention.

The advantage of this is that, due to the integral design of the centering projection with the first clutch element, additional processing time can be economized. Additionally, this also allows economizing assembly time. Furthermore, the integral design predetermines the angulation of the centering element with the pressing tool, whereby the accuracy of said angulation can be increased in comparison with a solution with mechanical post-processing. With the at least one centering projection, the connection of the first clutch element to the housing element for the transmission of torque can be achieved.

According to embodiment variants of the invention in this respect, it may be provided that the centering projection has a height above the end face of a maximum of 10 mm, and/or that the centering projection has a width of a maximum of 30 mm. Due to the relatively low height, the pressing of the first clutch element can be designed to be safer with the centering projection, resulting in barely any pressing tears. The small width of the centering projection aids in reducing and/or avoiding dimensional fluctuations, whereby a subsequent processing of the centering projection can be avoided. In this embodiment, sintering fluctuations at the inner diameter have no influence on the accuracy of the position and the shape of the centering projection. Thus, with each of the two embodiment variants separately or in combination, it is possible to produce off-tool first clutch elements.

Here, off-tool means that after sintering and/or after the additive production of the clutch element, no further processing steps are necessary, with the exception of a possible calibration step to be performed after sintering (for increasing the density of the clutch element or for improving the dimensional accuracy of the clutch element, etc.).

According to further embodiment variants of the invention, it may be provided, for simplifying the centering of the first clutch element when establishing the positive locking fit and/or force-fit between the first and the third clutch element, that the centering projection has a trapezoidal cross-section when viewed in the longitudinal section and/or cross-section, and/or that the centering projection has a frustum-shaped design, and that lateral edges of the frustum-shaped centering projection are possibly fractured.

According to further embodiment variants of the invention, it may be provided that the first clutch element has an annular design, so that the first base body has an outer circumference and an inner circumference, and that the centering projection is formed so as to be spaced apart from the outer circumference and from the inner circumference or so as to be directly adjacent to the inner circumference. Thereby, the mechanical load of the centering projection when establishing the positive-locking fit between the two clutch elements can be reduced.

In order to simplify the installation of the first clutch element, it may be provided, according to an embodiment variant of the invention, that a mounting aid element is arranged on a side surface of the at least one centering projection.

For the purpose of better understanding of the invention, it will be elucidated in more detail by means of the figures below.

These show in a respectively very simplified schematic representation.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
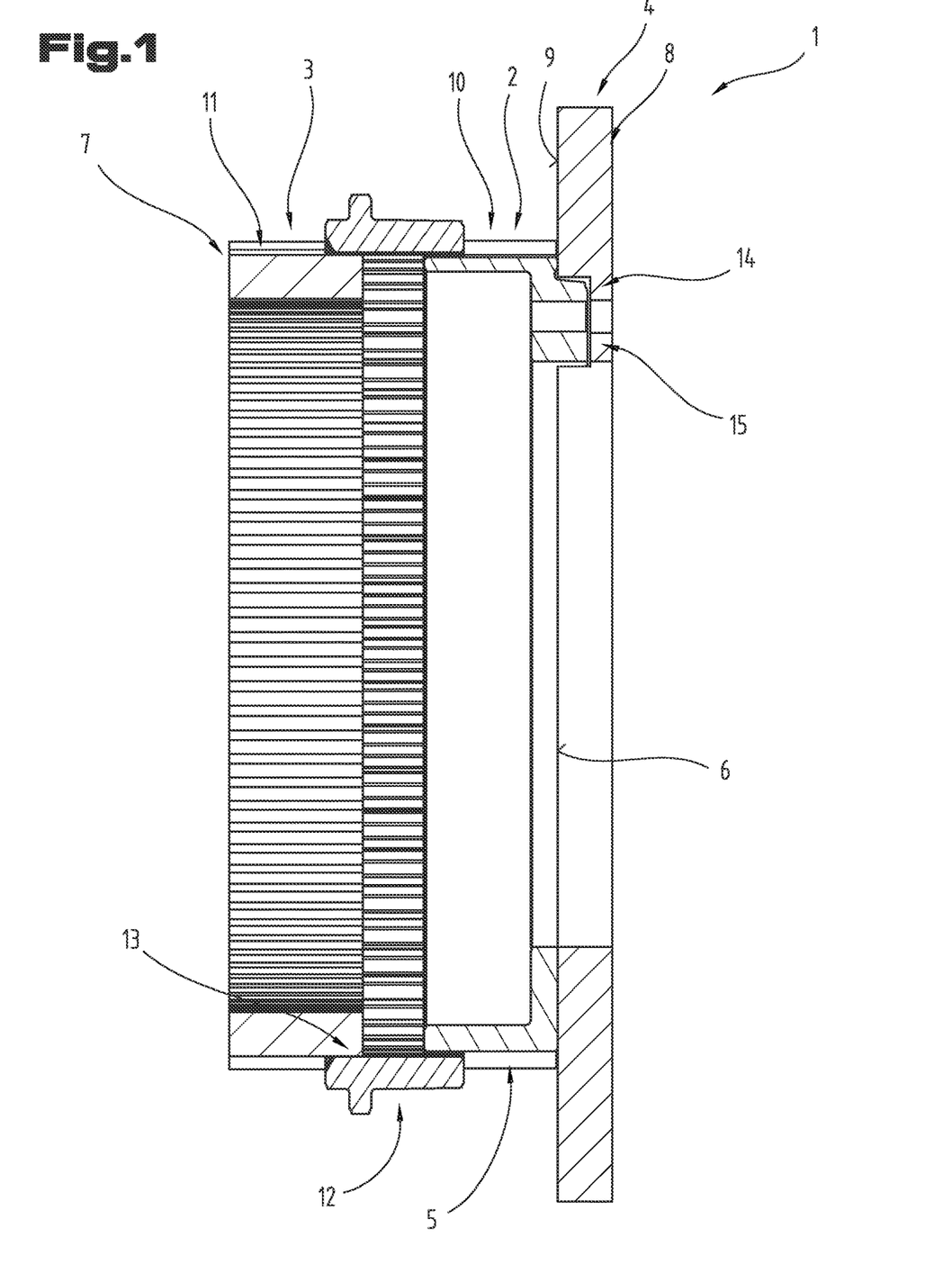
FIG. 1 a clutch in the closed position.
Figure 2:
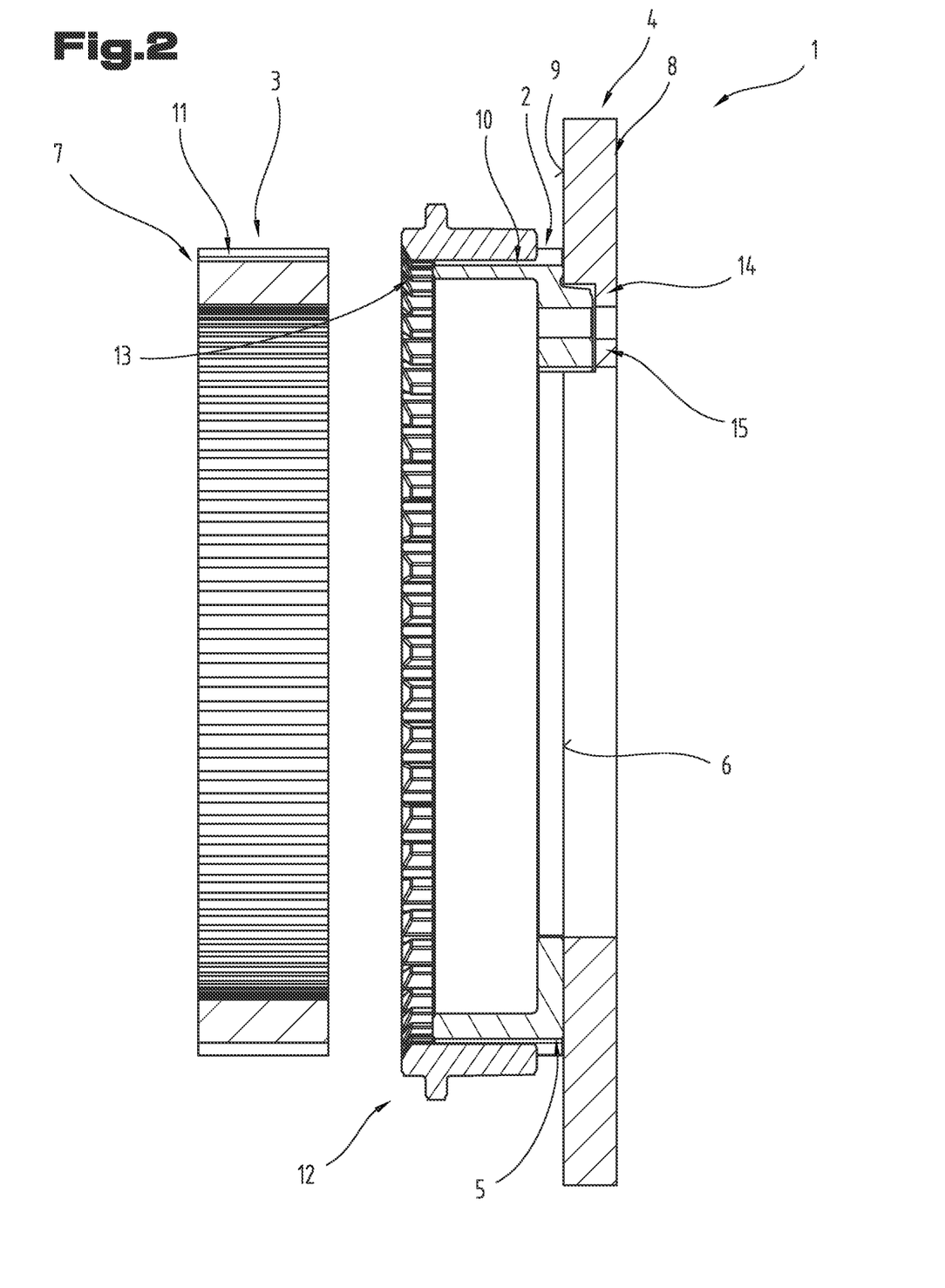
FIG. 2 the clutch according to FIG. 1 in the open position.

In FIGS. 1 and 2, a clutch 1 for transmitting a torque is shown in the closed position (FIG. 1) and the open position (FIG. 2). The clutch 1 comprises and/or consists of a first clutch 2 (can also be referred to as carrier body or hub), a second clutch element 3, and a third clutch element 4 (in particular a housing and/or housing part).

The first clutch element 2 has a first (annular) base body 5 with a first end face 6.

The second clutch element 3 has a second (annular) base body 7.

The third clutch element 4 has a third base body 8, which may be part of a housing, for example a housing of an electric motor. The third base body 8 of the third clutch element 4 has an end face 9, which faces the first end face 6 of the first clutch element 2.

On the respective outer circumference, the first clutch element 2 may have a first end toothing 10, preferably a spur toothing, and the second clutch element 3 may have a second end toothing 11, preferably a spur toothing.

The first clutch element 2 may be arranged on a first axle and/or axle end and/or shaft, and the second clutch element 3 may be arranged on a second axle and/or shaft.

FIG. 1 shows the clutch 1 in the closed position. The first clutch element 2 is arranged so closely to the second clutch element 3 that the transmission of the torque becomes possible. For transmitting the torque, a positive-locking fit and/or force-fit is formed in the clutch element between the first clutch element 2 and the second clutch element 3. In the embodiment variant of the clutch 1 according to FIG. 1, this positive-locking fit and/or force-fit is established via a sliding sleeve 12 having an internal toothing 13. In the open position, the internal toothing 13 engages with the two end toothings 10, 11 of the first and second clutch element 2, 3 in a torque-transmitting manner. The sliding sleeve 13 is arranged so as to be displaceable in the axial direction. The first and the second clutch element 2, 3, however, are arranged in the clutch 1 such that they are not axially displaceable.

The positive-locking fit between the two clutch elements 2, 3, may, however, also be established otherwise than with the sliding sleeve 12.

In the open position of the clutch 1, the sliding sleeve 12 engages only with the first end toothing 10 of the first clutch element 2.

On the first end face 5 of the first clutch element 2, at least one centering projection 14 (can also be referred to as fitting element) is formed, which protrudes in the direction towards the third clutch element 4 beyond the first end face 6 of the first clutch element 2 and engages with a centering recess 15 in the end face 9 of the third clutch element 4. Preferably, a positive-locking fit and/or force-fit between the first and the third clutch element 2, 4 is also established via this centering projection 14. The centering projection 14 serves for the alignment of the first clutch element 2 on a planar surface (of the end face 9 of the third clutch element 4) and the torque transmission. The first clutch element 2 does not carry out any axial movements. It may, for example, be fixed, or mounted on a housing, for example a clutch housing or a housing of a drive, for example an electric motor.

Figure 3:
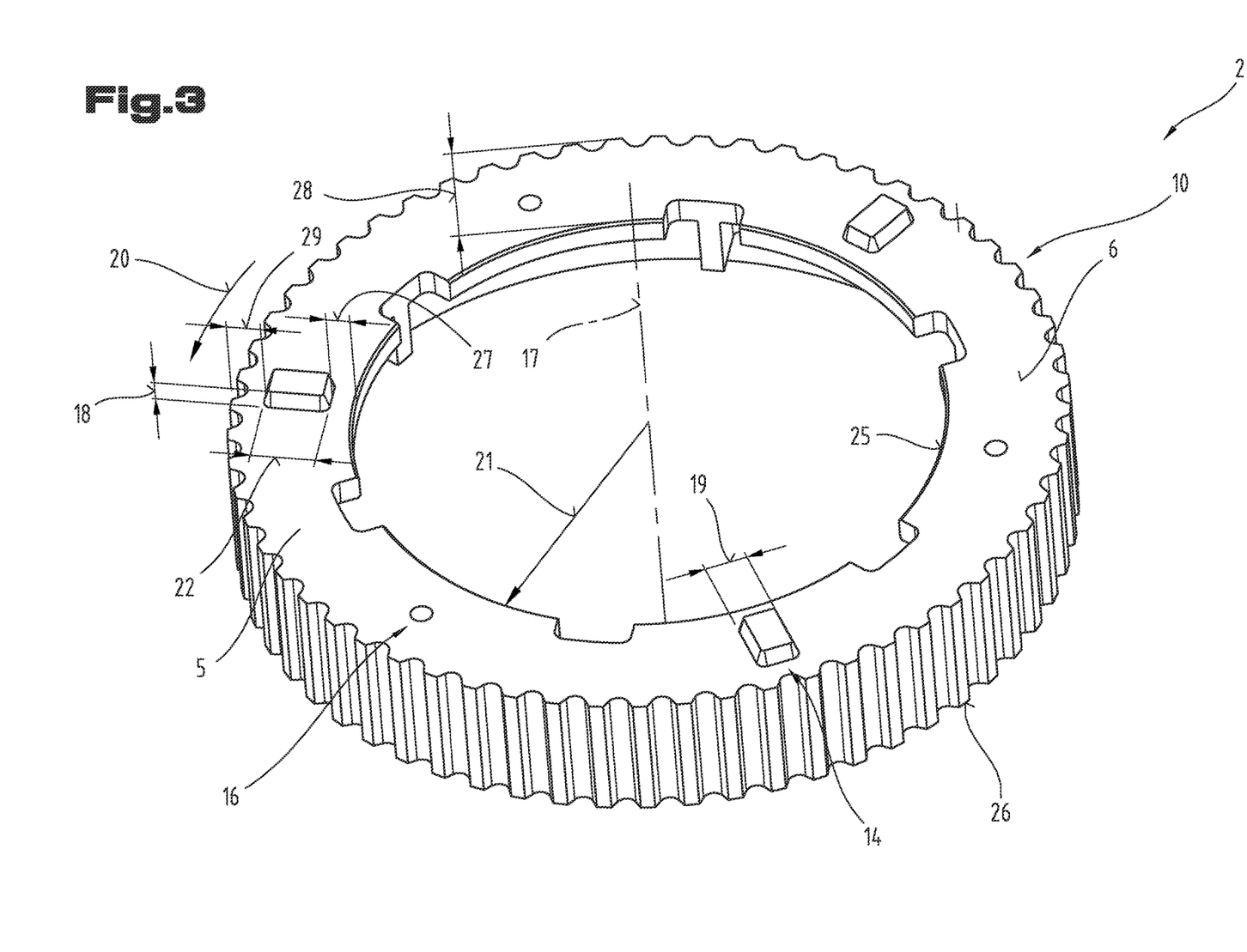
FIG. 3 a first clutch element.

FIG. 3 shows a first embodiment variant of the first clutch element 2. The first base body 5 with the first end face 6 and the end toothing 10 can be seen. On the first end face 6, three centering projections 14 are arranged, in particular evenly distributed offset to one another, in each case by 120°.

Although the shown number of centering projections 14 is preferred, it must not be understood as limiting. Fewer or more than three centering projections 14 may also be arranged, for example two or four, etc.

In the base body 4 of the first clutch element 2, three bores 16 are shown, which extend through the base body 4 in the axial direction 17. In the prior art, these bores 16 serve to receive so-called dowel pins, which are also used for centering the first clutch element 2, for example on the third clutch element 4. As these dowel pins are no longer necessary, these bores 16 are also not necessary. However, they may still be present in the base body 4 as shown, so that the first clutch element 2 can thus be optionally used either in a conventional clutch or in a clutch 1 according to the invention. These bores 16 may also be used for fixing the first clutch element 2 on the third clutch element 4, for example for passing screws through the first clutch element 2. Due to the embodiment according to the invention of the first clutch element 2, however, an exact design of the bores 16 with respect to receiving dowel pins is no longer required.

The first clutch element 2 is produced according to a powder-metallurgical method or an additive method. The centering projections 14 are thus formed integrally with the first base body 4 and/or the rest of the first clutch element 2.

Powder-metallurgical methods per se are well known from the prior art such that a detailed explanation of the essentials of this method is dispensed with. In this regard, it should only be mentioned that the method essentially comprises the steps of providing a, preferably metallic, powder, filling the powder into a powder press, pressing the powder to form a green compact, removing the green compact from the powder press, single or multi-stage sintering of the green compact into a sintered component, optional redensification of the sintered component and possibly hardening the sintered component. As regards these method steps, reference is thus made to the relevant prior art.

For forming the at least one centering projection 14, the shape of the powder press, that is particularly an upper stamp or a lower stamp of the powder press, is formed accordingly with at least one recess, so that powder for the centering projection 14 can be received in said recess.

As explained, it is also possible to use an additive production method (3D printing method) instead of a powder-metallurgical method for producing the first clutch element 2. For example, the first clutch element 2 can be produced by means of laser powder bed fusion, selective laser sintering, electron beam powder bed fusion, selective laser sintering, binder jetting, direct energy deposition, mold jet method, fused deposition molding, stereolithography method, and other methods. In particular, the cold metal fusion method (CMF method) can be used as an additive method.

The second clutch element 3 and/or the third clutch element 4 can also be produced according to a powder-metallurgical method or an additive method.

If more than one centering projection 14 is provided on the first base body 4 of the first clutch element 2, all centering projections 14 preferably have the same design. The embodiments in this description regarding the centering projection 14 can thus also be applied to all further centering projections 14 of a first clutch element 2. However, it is also possible that the centering projections 14 of a first clutch element 2 are different form one another.

The centering projection 14 may have any suitable shape and geometry, for example have a cylindrical shape or cuboid shape or hemispherical shape and/or the shape of a spherical segment or an ovoid shape, etc. Furthermore, the dimensions may also be selected accordingly, so that the centering projection 14 fulfils its function. This applies in particular when the first clutch element 2 is produced by means of an additive method.

For the purposes of testing the invention, however, the following embodiment variants of the centering projection 14 have proven advantageous, in particular when the first clutch element 2 is produced according to a powder-metallurgical method, as thus, the first clutch element 2 can be formed off-tool, as it has already been explained above.

Thus, it can be provided, as can be seen in FIG. 3, that the centering projection 14 has a height 18 above the first end face 9 of a maximum of 10 mm, in particular a maximum of 6 mm, for example a maximal of 5.5 mm. The height 18 of the centering projection 14 can, in this regard, be at least 0.5 mm, in particular at least 1 mm, for example at least 2 mm.

For the purposes of the invention, the height 18 of the centering projection 14 is generally measured between the first end face 6 of the first clutch element 2 and the highest point of the centering projection 14. The latter refers to the fact that the centering projection 14 on the axial end face, which can be made to face the third clutch element 4, is not necessarily formed to be planar as it is shown in the figures.

According to a further embodiment variant, the centering projection 14 may have a width 19 of a maximum of 30 mm, in particular a maximum of 22 mm, for example a maximum of 20 mm. The width 19 of the centering projection 14 can, in this regard, be at least 3 mm, in particular at least 4 mm, for example at least 5 mm.

For the purposes of the invention, the width 19 of the centering projection 14 is generally measured at the level of the first end face 6 of the first clutch element 2. In this regard, the width 19 is that dimension of the centering projection 14 which extends approximately in a circumferential direction 20 of the first clutch element 2. Here, "approximately" takes into consideration the fact that the circumferential direction is curved while the width 19 is not.

In the radial direction 21, the centering projection 14 may have a length 22 amounting to a maximum of 20 mm, in particular a maximum of 17 mm, for example a maximum of 15 mm. The length 22 of the centering projection 14 can, in this regard, be at least 4.5 mm, in particular at least 5 mm, for example at least 6 mm.

However, the length 22 may also deviate from the specified values, in particular if the first end face 6 is wider in the radial direction 21 than it is shown.

As can be seen from FIG. 3, the centering projection 14 may have a trapezoidal cross-section in the radial direction 21. This may have the shape of an isosceles trapezoid. However, the cross-section may also have the shape of a scalene or rectangular trapezoid, wherein in this case, the longer side is preferably closer to the inner diameter of the base body 5 than the comparatively shorter side.

It is furthermore possible, as an alternative or in addition thereto, that the centering projection 14 has a trapezoidal cross-section in the circumferential direction 20. This may have the shape of an isosceles trapezoid. However, the cross-section may also have the shape of a scalene or rectangular trapezoid, wherein in this case, the longer side is preferably formed in the direction of rotation of the first clutch element 2.

Due to this cross-sectional shape, the centering projection 14 can have a cross-section decreasing in the axial direction 17, starting at the end face 6, as the height increases (when viewed in the axial direction), so that the centering projection 14 may be formed to be tapering in the axial direction 17. The cross-sectional tapering may be formed on one side, multiple sides, or all sides with respect to the lateral surfaces of the centering projection 14. In this regard, it is possible that an upper axial end face 23 is smaller, by at least 0.5% and/or a maximum of 3%, than a base surface of the centering projection 14 directly adjacent to the first end face 6 of the base body 5 of the first clutch element 2.

According to a particular embodiment variant of the first clutch element 2, the centering projection 14 may have a frustum-shaped design.

Figure 4:
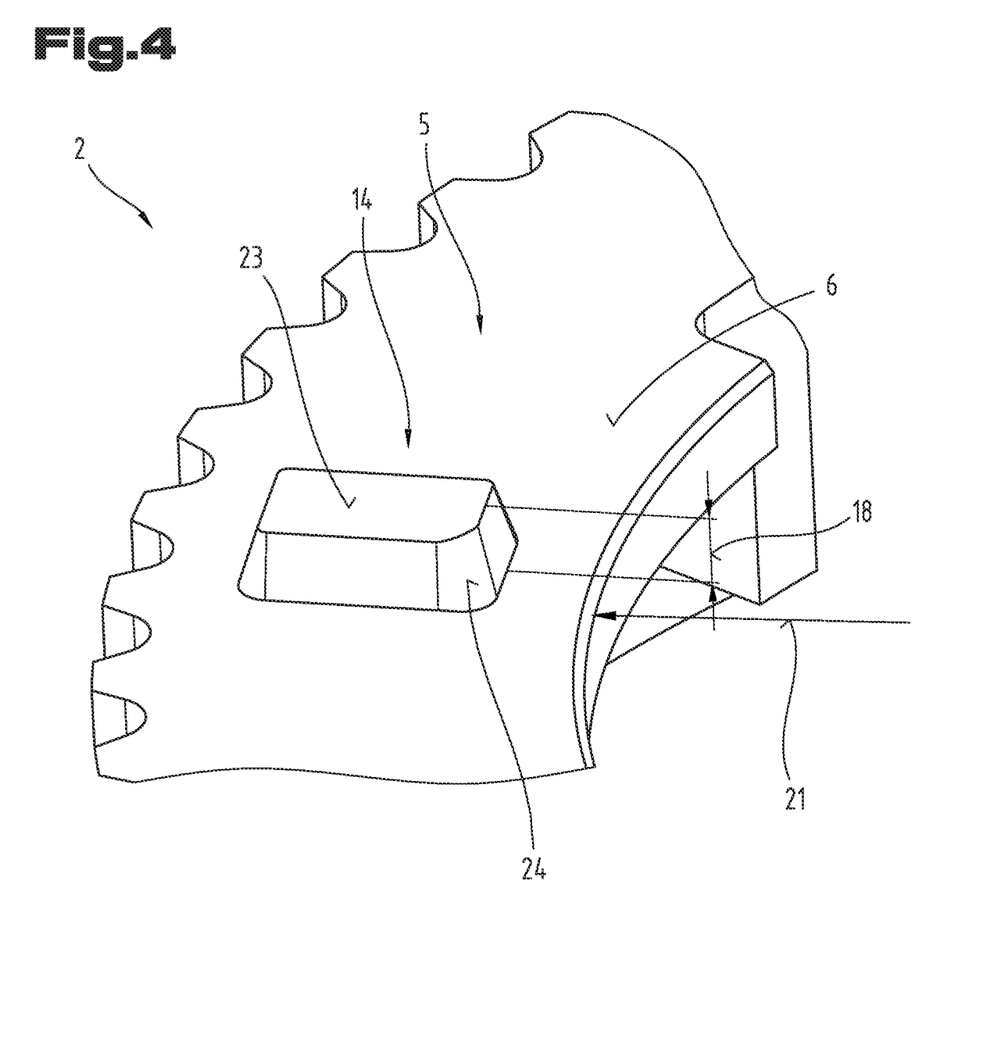
FIG. 4 a detail of the first clutch element according to FIG. 2.

According to another embodiment variant, it may further be provided that lateral edges of the centering projection 14, in particular of the frustum-shaped centering projection 14, are fractured or rounded, as it can also be seen in FIG. 4. This may be guided so far that intermediate surfaces 24 are formed between the side surfaces of the centering projection 14—as can be seen in FIG. 4.

With these embodiment variants, it can also be achieved that the establishment of the positive-locking fit between the first and the second clutch element 2, 3 can be facilitated due to the improvement of the centering projection 14 sliding into the centering recess 15.

The centering recess 15 may have the corresponding negative form of the shape of the centering projection 14. However, it may also be formed to be greater than the centering projection 14 at the end face 9 of the third base body 8, in particular at the first end face 6 of the first base body 5, preferably in the circumferential direction 20. Generally, the centering recess 15 may be formed longer in the radial direction 21 than the centering projection 14, if a positive-locking fit between the centering projection 14 and the centering recess 15 is formed in the circumferential direction 20. The positive-locking fit may, however, also be formed in the radial direction 21.

According to a further embodiment variant of the first clutch element 2, it may be provided that the centering projection 14 is arranged both to an inner circumference 25 and to an outer circumference 26 of the annular first clutch element 2. A distance 27 from the inner circumference 25 may amount to between 10% and 20% of a total width 28 of the first clutch element 2 in the radial direction 21. A distance 29 from the outer circumference 26 may amount to between 10% and 20% of a total width 28 of the first clutch element 2 in the radial direction 21.

Figure 5:
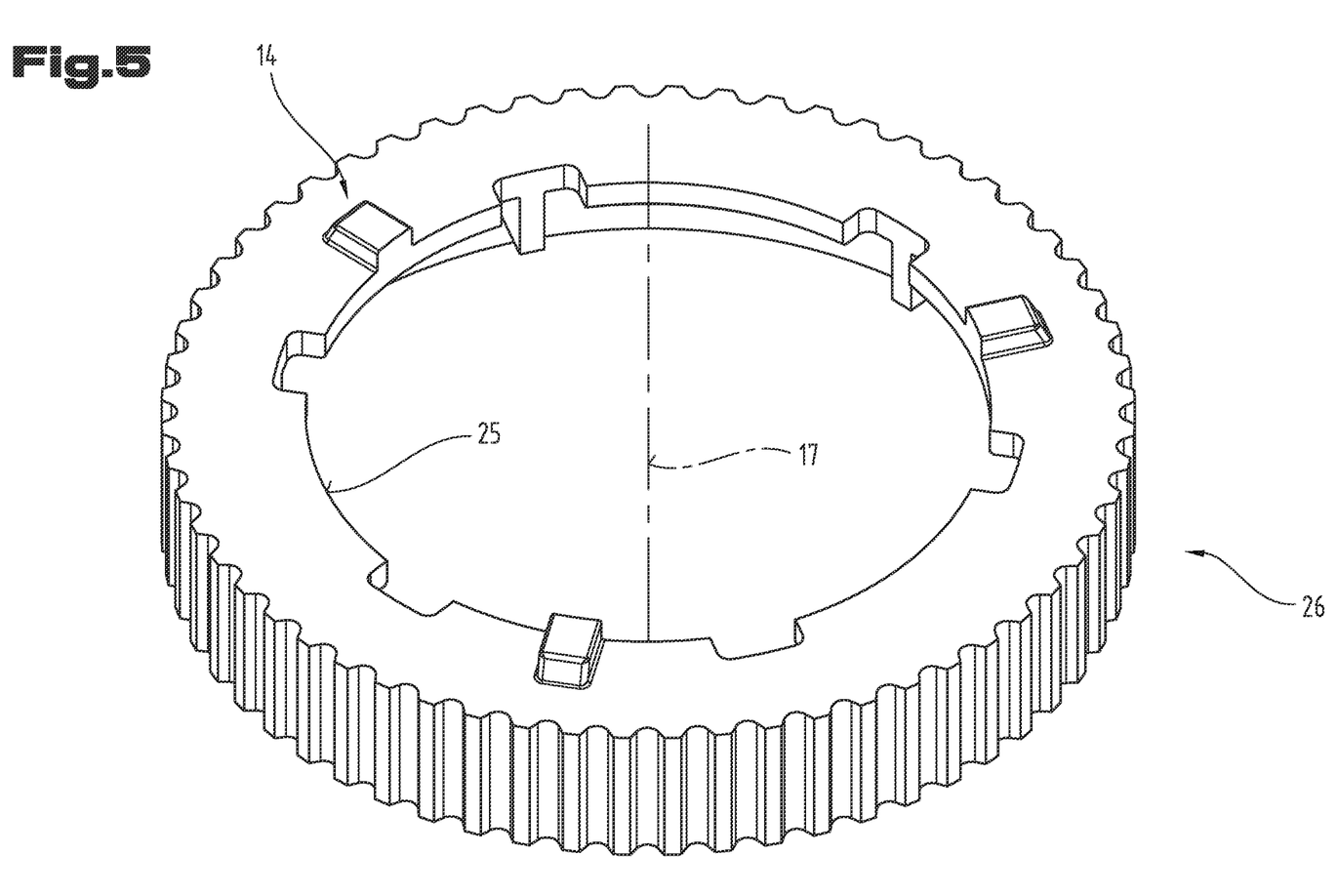
FIG. 5 an embodiment variant of a first clutch element.

According to an embodiment variant of the first clutch element 2, it may also be provided, as can be seen in FIG. 5, that the centering projection 14 is formed and/or arranged directly adjacently to the inner circumference 25 of the first clutch element 2 and at a distance from the outer circumference 26. A side surface of the centering projection 14 can, in this regard, be formed in extension of the inner jacket surface of the first clutch element 2 in the axial direction 17 and extend in the axial direction 17.

However, preferably, the distance 27 from the inner circumference 25 amounts to at least 2.5 mm, as thereby a higher stability of the tool for the powder-metallurgical production of the first clutch element 2 can be achieved.

It is also possible, albeit not preferred, that the centering projection 14 is formed and/or arranged directly adjacently to the outer circumference 25 (see FIG. 3) of the first clutch element 2.

Figure 6:
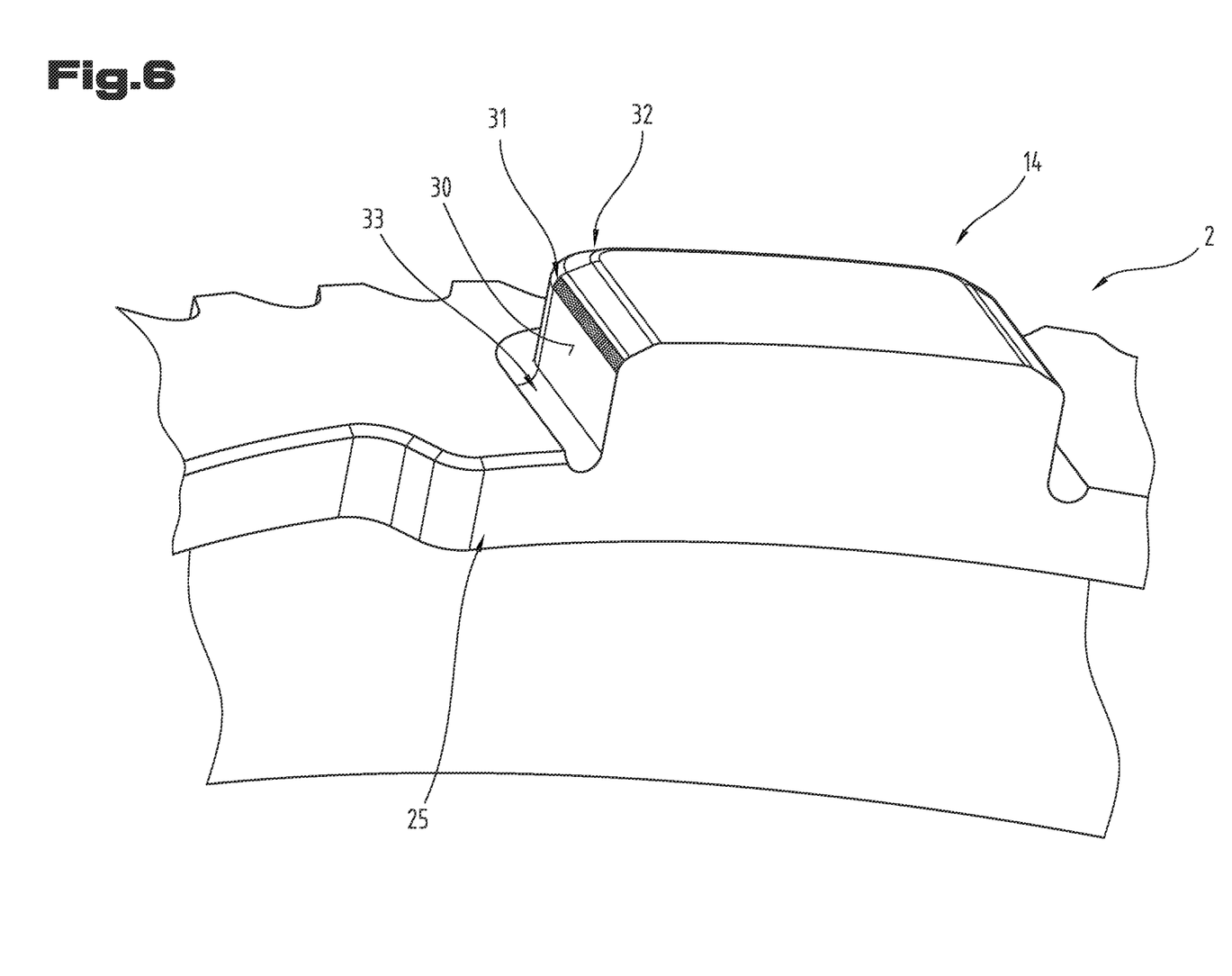
FIG. 6 a further embodiment variant of a first clutch element.

FIG. 6 shows cutouts of a further embodiment variant of the first clutch element 2 in the region of a centering projection 14. Here, a mounting aid element 31 is arranged at at least one side surface 30, preferably at multiple side surfaces 30, of the centering projection 14. The mounting aid element 31 may be formed integrally with the centering element 14, for example in the shape of an oblique surface at the transition from the side surface 30 to an end face region 32.

From FIG. 6, it can further be seen that, at the base of the centering projection 14, a (groove-shaped) recess 33 may be formed at least in some sections, preferably across the whole circumference, possibly disregarding the region of the centering projection 14 at the inner circumference 25 (as shown in FIG. 6). Thereby, a clearance is achieved, so that the transition radius (centering element to planar surface) is arranged below the planar surface. Thus, a chamfer at the third clutch element 4 cooperating with the first clutch element 2 can be dispensed with.

Figure 7:
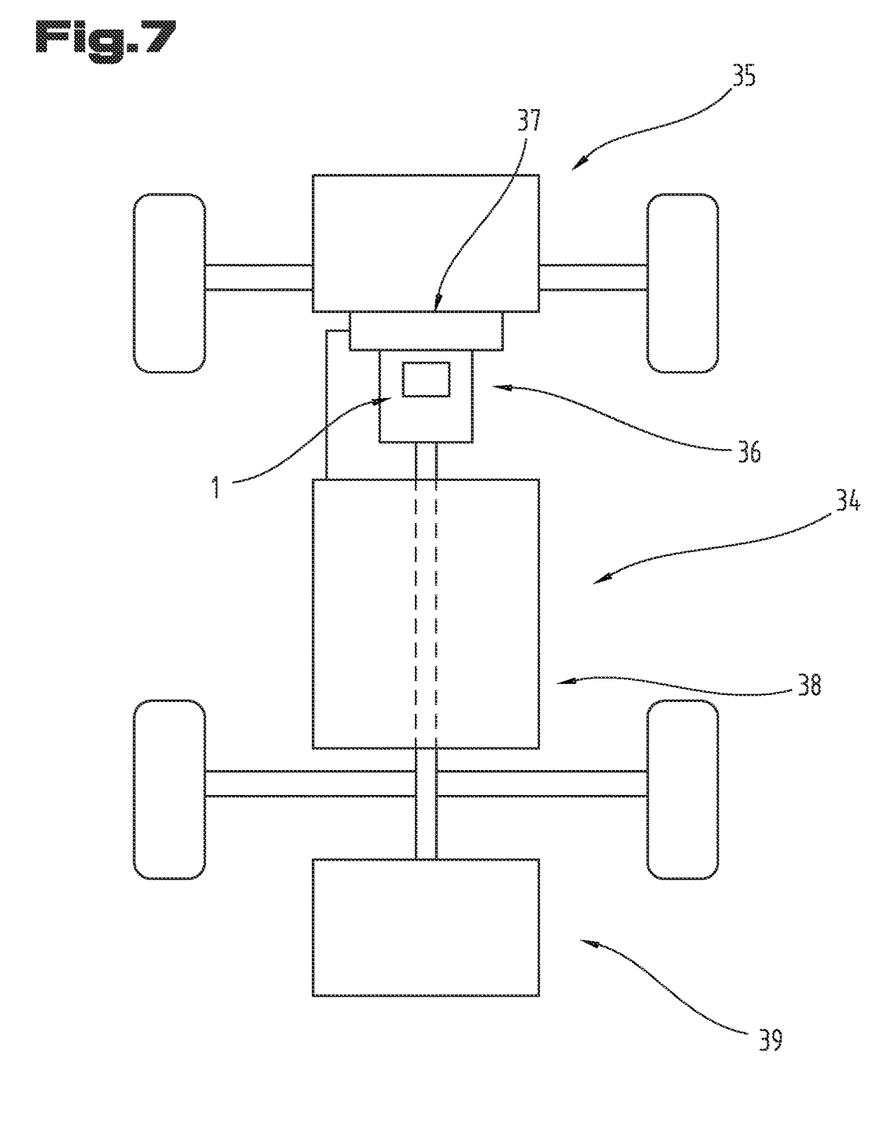
FIG. 7 a drive train of a motor vehicle.

The clutch 1 is preferably used in a drive train 34 of a motor vehicle having two drives, in particular having one combustion engine 35 and one electric motor 32, as it is shown schematically in FIG. 7 as a so-called plug-in hybrid electric vehicle. However, the drive train may also have a second electric motor instead of the combustion engine 35 or in addition to it. Apart from the mentioned components, FIG. 7 further shows a power electronics module 37, a rechargeable battery 38, and a fuel tank 39, which may also be dispensed with in an arrangement of two electric motors.

The clutch 1 serves, in particular, to connect or disconnect the electric motor 36 for driving the motor vehicle. For this purpose, the clutch 1 may be arranged in a so-called disconnect unit.

However, it should be noted that the embodiment of a hybrid drive, shown in FIG. 7, is only to be understood as an example, as other hybrid drives for motor vehicles are known from the prior art.

Furthermore, the clutch 1 may also be used differently, for example for connecting or disconnecting an all-wheel drive, etc.

The exemplary embodiments show or describe possible embodiment variants of the clutch 1 and/or the drive train 34, while it should be noted at this point that combinations of the individual embodiment variants are also possible.

Finally, as a matter of form, it should be noted that for ease of understanding of the structure the clutch 1 and/or the drive train 34, these are not obligatorily depicted to scale.

| | List of reference numbers |
|---|---|
| 1 | Clutch |
| 2 | Clutch element |
| 3 | Clutch element |
| 4 | Clutch element |
| 5 | Base body |
| 6 | End face |
| 7 | Base body |
| 8 | Base body |
| 9 | End face |
| 10 | End toothing |
| 11 | End toothing |
| 12 | Sliding sleeve |
| 13 | Internal toothing |
| 14 | Centering projection |
| 15 | Centering recess |
| 16 | Bore |
| 17 | Axial direction |
| 18 | Height |
| 19 | Width |
| 20 | Circumferential direction |
| 21 | Radial direction |
| 22 | Length |
| 23 | End face |
| 24 | Intermediate surface |
| 25 | Inner circumference |
| 26 | Outer circumference |
| 27 | Distance |
| 28 | Total width |
| 29 | Distance |
| 30 | Side surface |
| 31 | Mounting aid element |
| 32 | End face region |
| 33 | Recess |
| 34 | Drive train |
| 35 | Combustion engine |
| 36 | Electric motor |
| 37 | Power electronics module |
| 38 | Rechargeable battery |
| 39 | Fuel tank |

The invention claimed is:

1. A torque-transmitting clutch comprising:
a first clutch element having a first base body and a first end face,
a second clutch element having a second base body, and
a third clutch element having a third base body,
wherein the first clutch element and the second clutch element are connectable in a positive locking manner for a closed position for transmitting torque, and in an open position, this positive locking connection is released, and
wherein the first clutch element is connectable to the third clutch element in a positive locking manner,
wherein the first clutch element is produced according to a powder-metallurgical method or an additive method and has at least one centering projection, which is arranged on the first end face and extends in the direction towards the third clutch element, in order to cooperate with and/or be accommodated with a centering recess in an end face in the third clutch element in a positive locking manner, and
wherein the centering projection has a height in an axial direction above the first end face of a maximum of 10 mm.

2. The clutch according to claim 1, wherein the centering projection has a width in a circumferential direction of a maximum of 30 mm.

3. The clutch according to claim 1, wherein the centering projection has a trapezoidal cross-section in a radial direction when viewed in the longitudinal section and/or the cross-section.

4. The clutch according to claim 1, wherein the centering projection is formed to be frustum-shaped.

5. The clutch according to claim 4, wherein intermediate surfaces are formed between side surfaces of the frustum-shaped centering projection.

6. The clutch according to claim 1, wherein the first clutch element has an annular design, so that the first base body has an outer circumference and an inner circumference, and wherein the centering projection is formed so as to be spaced apart from the outer circumference and from the inner circumference or so as to be directly adjacent to the inner circumference.

7. The clutch according to claim 1, wherein a mounting aid element is arranged on a side surface of the at least one centering projection.

8. A drive train of a motor vehicle with two drives, wherein one of the two drives is connected to or released from the drive train by the clutch formed according to claim 1.

9. A torque-transmitting clutch comprising:
a first clutch element having a first base body and a first end face,
a second clutch element having a second base body, and a third clutch element having a third base body, wherein the first clutch element and the second clutch element are connectable in a positive locking manner for a closed position for transmitting torque, and in an open position, this positive locking connection is released, and wherein the first clutch element is connectable to the third clutch element in a positive locking manner, wherein the first clutch element is produced according to a powder-metallurgical method or an additive method and has at least one centering projection, which is arranged on the first end face and extends in the direction towards the third clutch element, in order to cooperate with and/or be accommodated with a centering recess in an end face in the third clutch element in a positive locking manner, and wherein the centering projection has a width in a circumferential direction of a maximum of 30 mm.

* * * * *